United States Patent

Berteau

[15] 3,636,520

[45] Jan. 18, 1972

[54] COMPUTER SYSTEM FOR IMPROVED DATA TRANSMISSION

[72] Inventor: Charles Donald Berteau, 8056 Bloomington Avenue South, Minneapolis, Minn. 55420

[22] Filed: Feb. 5, 1970

[21] Appl. No.: 8,779

[52] U.S. Cl. .......... 340/172.5

[51] Int. Cl. .......... G06f 9/00

[58] Field of Search .......... 340/172.5

[56] References Cited

UNITED STATES PATENTS 3,411,139 11/1968 Lynch et al. .......... 340/172.5

3,500,336 3/1970 Cuccio .......... 340/172.5

*Primary Examiner*—Raulfe B. Zache

*Assistant Examiner*—Harvey E. Springborn

*Attorney*—Reif and Gregory

[57] ABSTRACT

A method for the movement of information within data systems utilizing a digital computer and remote terminal transmission facilities to provide improved efficiency by shifting the function of editing certain data from the computer to remote terminals and reducing the transmission time of data records between the computer and the remote data terminals.

1 Claims, 7 Drawing Figures

INVENTOR.
CHARLES DONALD BERTEAU
BY
Reifsnider Gregory
ATTORNEYS

PATENTED JAN 18 1972 3,636,520

SHEET 2 OF 3

INVENTOR
CHARLES DONALD BERTEAU

BY Richard Gregory

ATTORNEYS

INVENTOR.
CHARLES DONALD BERTEAU
BY Reifan Gregory
ATTORNEYS

COMPUTER SYSTEM FOR IMPROVED DATA TRANSMISSION

BACKGROUND OF THE INVENTION

This invention relates to an improvement in a method for the division of functions with respect to the movement of information within a computer system to shift some of the functions of a digital computer to a remote data terminal thereby reducing the workload on the digital computer, reducing the data-transmission time and more fully utilizing the data terminal. The improved method herein relates to a modification of a computer to accept an expanded computer language including source program statements for the editing of certain data in a remote data terminal, providing for the editing of data in the remote data terminal by loading the terminal with an object program and transmitting coded instructions and unedited data from the digital computer to the remote data terminal, said instructions being interpreted by the remote terminal to perform the editing of said unedited data to produce useable output.

A present practice with respect to the nontransmission of certain data from a computer to a remote terminal involves the use of a piece of hardware in connection with a computer to suppress the data transmitted by removing therefrom certain symbols or spaces and by the use of related hardware equipment in connection with the remote terminal for the insertion into the data record transmitted, the symbols and spaces suppressed. Here there is involved the use of additional hardware equipment for the accomplishment of the results which are achieved within the invention herein without the use of said additional hardware equipment but instead with the use of software equipment.

An object of this invention relates to a reduction in transmission time and related costs by a decentralization of the process of editing.

Another object of this invention is to transfer certain functions from a computer to a remote data terminal, said computer not being essential for performance of said functions.

Still another object of this invention is to transfer to a remote data terminal the editing of certain portions of data to produce useable output.

More specifically, it is an object of this invention to modify a compiler to create an object program which includes key codes but which omits instructions for the insertion of certain data in the data records with which the key codes are associated.

It is also a specific object of this invention to create an object program which includes key codes for transmission from the digital computer to a remote data terminal, said key codes including instructions for the insertion by said remote data terminal of certain data to the data records in producing useable output, said certain data having been omitted from said data records by said digital computer.

It is also an object of this invention to adapt a remote data terminal to provide it with the capability of interpreting key codes to accomplish the editing of data records.

These and other objects and advantages of the invention will be set forth in the following description made in connection with the accompanying drawings in which like reference characters refer to similar parts throughout the several views and in which FIG. 1 is a flow diagram of a conventional computer system in block form;

DESCRIPTION OF A PREFERRED EMBODIMENT

The method herein for processing information through a computer information system provides a more efficient transmission of information and provides for a division of functions between the main computer and data terminals.

A computer such as an IBM 360, performs many functions such as making calculations, matching sets of data, arranging data and transforming data from one form to another. Said last mentioned function is given particular consideration by way of example with respect to the method herein. A very common data transformation function is "editing" or "formatting" data for output is useable form. The method herein is applicable to various computer systems and to various combinations of hardware and software. For explanation of terms used reference is had to the American National Standard Vocabulary for Information Processing by American National Standards Institute, Inc. 1430 Broadway, New York, N.Y. 10018, edition ANSI *x*3.12–1970, approved Feb. 1970.

Figures 3, 4, 5, 6, 7:
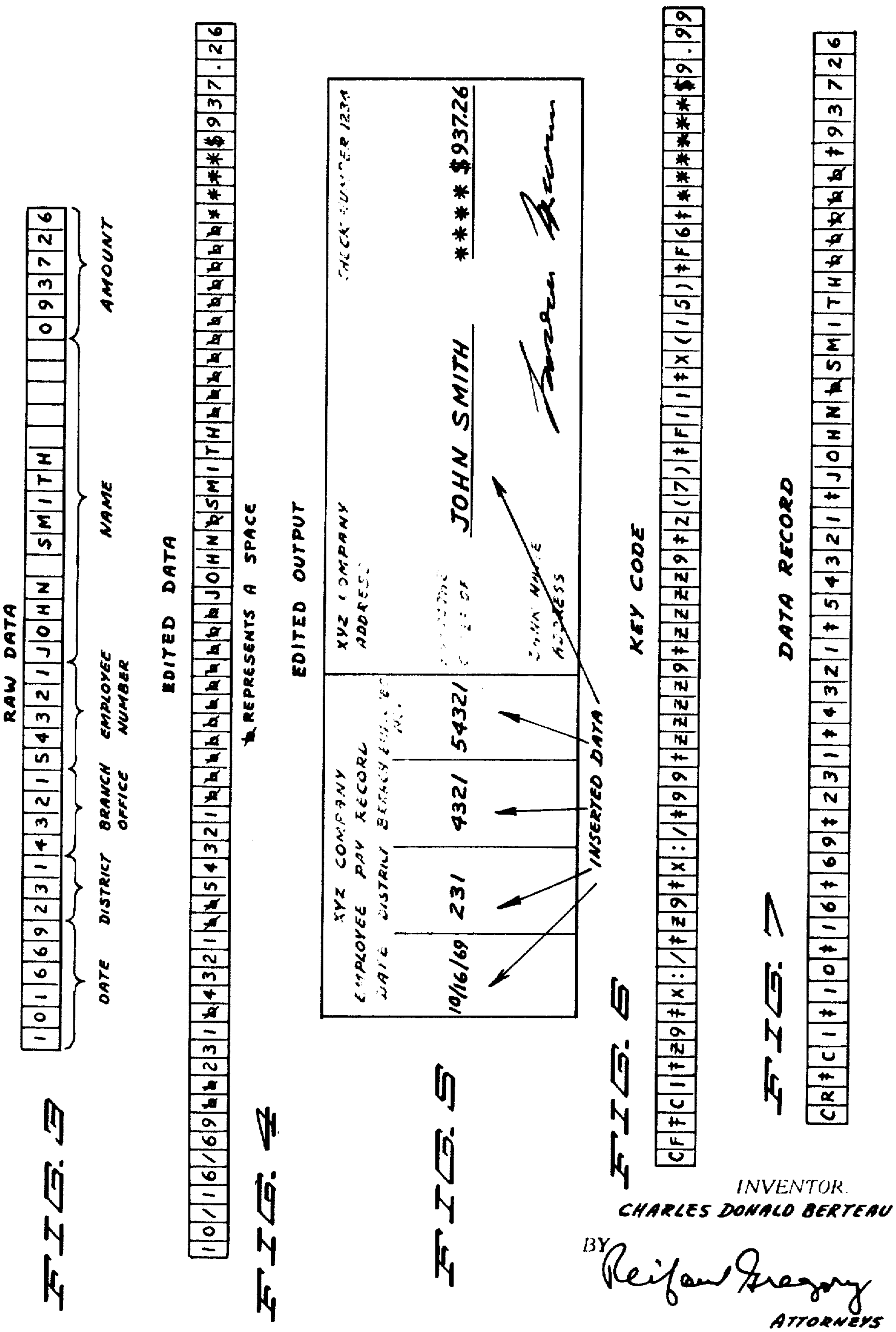
FIG. 3 is an example of a raw data record.
FIG. 4 is an example of an edited data record.
FIG. 5 is an example of edited or useable output.
FIG. 6 is an example of a key code.
FIG. 7 is an example of a data output record to be edited.

Data stored in a computer memory is usually stored as a string of codes representing characters and symbols and are stored in the form of "raw data" which data is usually packed into a condensed form as indicated in FIG. 3. This data may be taken to illustrate the result of a payroll process.

This data is "edited" by the digital computer hardware and software to transform it to the form of a printed check output. The result of the editing operation includes the insertion of spaces, decimal points, commas and other symbols, thus putting the data in suitable form for a business document such as a check. The "raw data" shown in FIG. 3 is shown in FIG. 4 in edited or transformed form. This data record shown in FIG. 4 is stored in the digital computer memory ad "edited output data" and is ready for output in useable form shown in FIG. 5.

The editing process by which the data is transformed from "raw data" to edited data is determined by a combination of the computer hardware and the computer program instructions. The specifications which explicitly define the form of the data before and after this transformation are generally written in the computer source program. These specifications represent a particular element of the method herein. The specifications include statements which when included in a completed source program would cause to be generated the computer instructions necessary to preform the editing operation for transformation of "raw data" to "edited output data" ready for output ad indicated respectively by FIG. 3 and 4.

Figure 1:
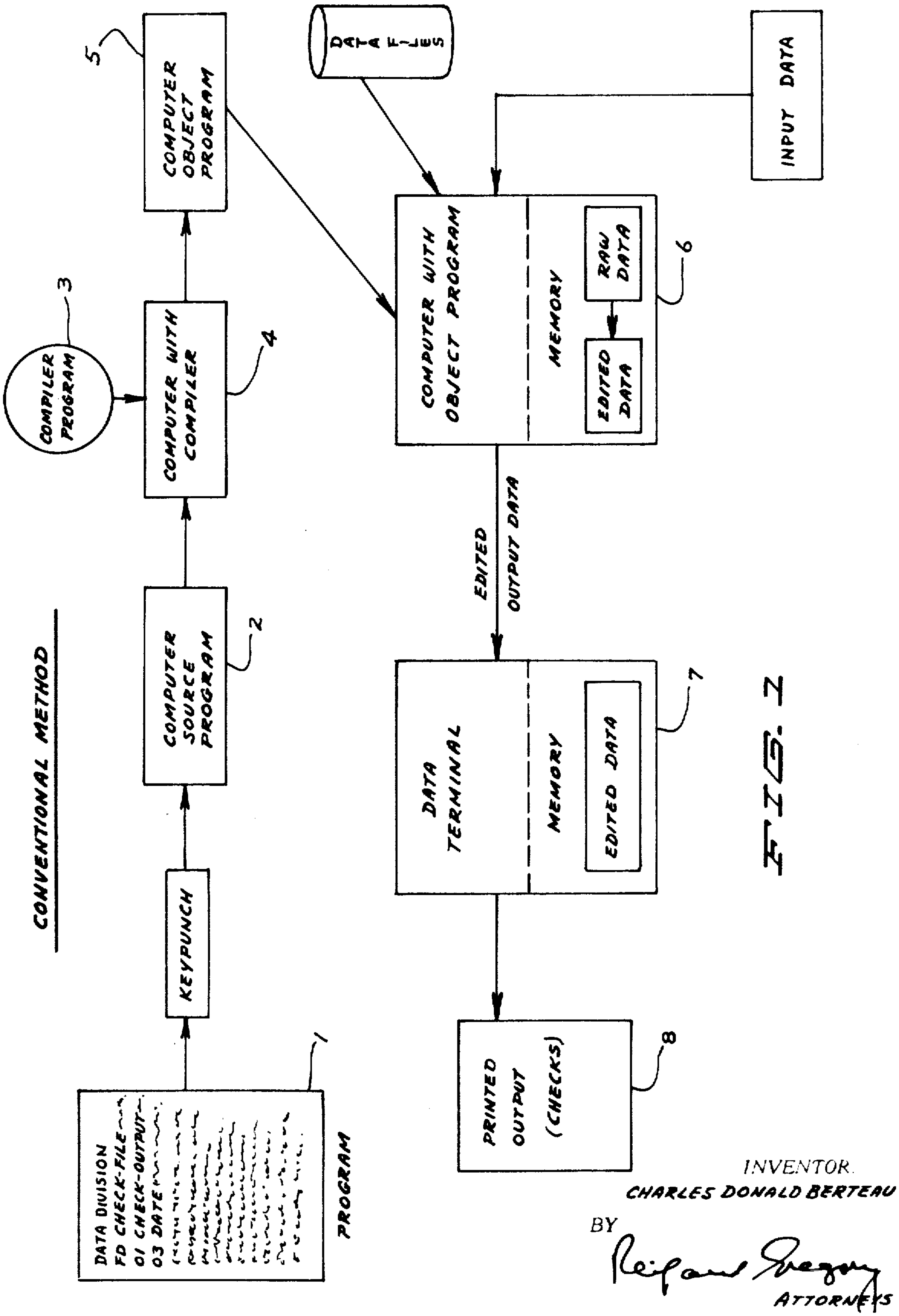

With reference to FIG. 1 and the conventional computer system indicated therein with self-explained conventional portions thereof indicated by reference numerals 1–8, when output data is to be transmitted to a remote data terminal, the "raw data" is edited by the digital computer and is stored in memory as "edited output data" as in FIG. 4. Said last mentioned data is transmitted character by character, which characters include spaces, zeros, decimal points and other symbols. This data is received by the remote data terminal in edited form ready to output as useable answers as indicated by the representation of the instrument in the form of a check in FIG. 5.

The essential element of interest here is the fact that the digital computer in addition to editing "raw data" with respect to making computations also edits the data to insert spaces and symbols which require no computing capability but which does use up in the process of the editing substantial computer time and in the process of transmission uses up significant transmission time. Said spaces and symbols may be characterized as nonsignificant data with respect to the data requiring computation. The system or method above indicated represents an operation which could be preformed with an IBM 360 computer.

The first requirement of the method herein is the adaptation or modification of a computer program 13 and of a compiler 14 with respect to an electronic digital computer for acceptance by said compiler of an expanded source language which includes words and phrases which are referred to as indicia. The method herein is applicable to computer languages generally but for the purpose of example, reference is had here to the use of COBOL language. In other programming languages the indicia uses may be special symbols instead of words and phrases as in the example herein.

Generally stated, the method herein includes providing source language statements which can identify certain logical data files as being associated with remote data terminals. The method herein also includes source program statements which specify procedures as being related to remote terminal data.

Reference is first had to the program compilation stage in the use of a digital computer as follows:

1. Certain logical data files must be identified as being associated with remote data terminals and to provide for this, additional key words and syntax are added within the environment divisions and data divisions. Specifically, as in the example hereinafter described, there will be added to the language used the phrase ACTUAL KEY IS to be used by the programmer to denote the labels attached to key codes.
2. There is also added the work REMOTE as a key word in connection with the phrase RECORDING MODE IS REMOTE as applied to files described in the data division.
3. There is also added to the language used the words REMOTE FORMAT in connection with the phrase OPEN OUTPUT FILE WITH REMOTE FORMAT.
4. The meanings of the verbs MOVE and WRITE are changed to omit editing as related to certain data as where editing of said data is implied in the data description and when said data is in a file associated with remote terminals.
5. The compiler 14 is adapted to accept the source language changes in the source program 12 and to generate a corresponding machine language in the object programs 15. For files identified as RECORDING MODE IS REMOTE, the compiler generates a key code for each record in the file. A key code is defined as a record which contains sufficient information to describe the form of an edited output record. This is a coded language which is constructed from the source program.
6. Said compiler is also adapted to omit the machine language instructions to perform editing of certain data and it does this in translating the verbs MOVE and WRITE as set forth in the numbered paragraph 4 above.
7. Said compiler with respect to an OPEN statement referring to a file identified as RECORDING MODE IS REMOTE generates machine language instructions in the object program 15 which causes the key codes to be transmitted to a remote data terminal.
8. From the data description of CHECK-FILE, a "format descriptor" or "key code" as in FIG. 6 is generated and identified by the literal value of the "format-name" As illustrated in FIG, 6, "CF" and "C1" represents the label for said key code.

The above numbered paragraphs relate directly to essential novelty of the invention herein in instructing the computer not to perform certain functions which functions will be performed by a remote data terminal. These are functions which do not require the computing capability of the computer but relate more specifically to certain data of which further description will be given hereafter. Data 100 Corp. of Minneapolis Minn. makes a computer terminal series 78 well adapted for use herein. Scientific Control Corp. of Dallas, Tex. makes a computer terminal DCT 132 well suited for purposes herein.

With reference to the program execution phase in connection with the above description, it will be understood that the use of a remote data terminal device embodies a small computer. The remote data terminal is loaded with an object program which receives records of information from the above-mentioned digital computer. The object program contains instructions for the recognition of said records of information as being unedited data records, key codes or edited data records. The key codes are stored in the memory of the remote terminal. When an unedited data record is received, its corresponding key code is interpreted to preform the editing required to transform the data record to desired useable output.

The key code describes the form of the output. This form includes certain relatively nonsignificant symbols such as blanks, zeros, commas, dollar signs and the like which were not added to the data before the data was transmitted from the digital computer to the remote data terminal. Said symbols are included within the data referred to above as certain data.

Such editing functions as the adding of said symbols were omitted from the machine language instructions of the object program in the digital computer and thus there was omitted the transmission of said symbols.

In the transmission of the data contained in a typical business document or instrument said symbols may very well comprise 20 to 60 percent of the total information transmitted. Said symbols most commonly consist of zeros, spaces, commas, dollar signs and the like which are required to make the document readable. See FIG. 5 and particular note should be had of the spacing between the items of information inserted. The task of inserting, that is, of editing these symbols, does not require the highly developed computing capacity of the digital computer. A remote date terminal is well suited for this use.

The method set forth herein coordinating a digital computer with a remote data terminal thus achieves significant economy and improved efficiency in utilizing the digital computer for the tasks it is most efficient and capable of performing that is of carrying out computations and in utilizing a remote data terminal for editing functions which it may efficiently perform.

Figure 2:
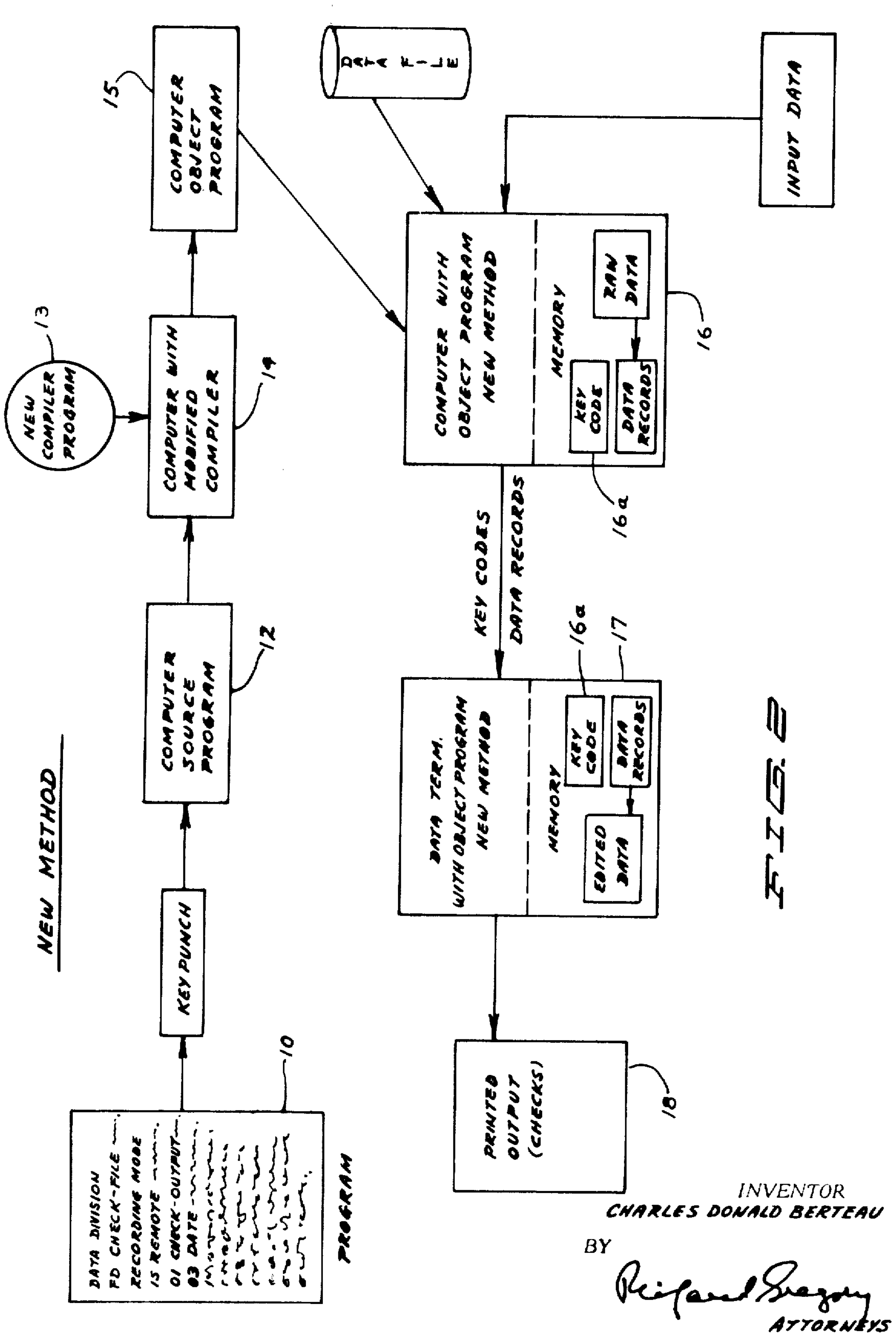
FIG. 2 is a flow diagram of a computer system similar to that of FIG. 1 showing the method which is the subject matter of the invention herein.

Reference is now had to FIG. 2, and to the various portions thereof indicated by the reference numerals 10–18 and to FIGS. 3–7 to illustrate the processing of data in accordance with the numerals 14 and 16 refer to the same main computer. Reference numeral 17 refers to a data terminal computer. The output of the computer system remains the same. As above described, the processing of information within the computer system is improved by reducing in quantity certain data which is transmitted and by shifting certain editing functions from the digital computer to the data terminal. To reduce transmission time, the data transmitted is represented in a more compact form as indicated in FIG. 7.

By certain programming statements before compiling or assembling the program, the "raw data" as shown in the example of FIG. 3, is identified as data to be transmitted to a remote data terminal as indicated by the reference numeral 17. The computer object program 14 is adapted to cause said identified data to be processed in accordance with the method herein.

The new programming statements above described in the numbered paragraphs cause instructions to be generated in the computer object program 15. The reference numeral 10–15 indicate the compilation stage of the computer system.

Said new program statements in connection with the software/hardware computer system perform the following functions in the following described execution stage of the computer system;

9. Responsive to the instructions CHECK-FILE IS OPENED, a key code is transmitted as an output record from the digital computer to the remote data terminal as indicated by the reference numeral **16*a* showing the transmission from the computer with reference to the 17**.

A conventional program as presently known in the art would include the statements OPEN OUTPUT CHECK-FILE, MOVE RAW-DATA TO CHECK-FILE and WRITE CHECK-OUTPUT and would include editing instructions for the performance of editing by editing by the digital computer.

In accordance with the methods herein, the new program statements MOVE RAW-DATA TO CHECK-FILE does not include instructions for editing. As described in the numbered paragraph 4 above, the verbs MOVE and WRITE are interpreted by the computer to omit the otherwise machine language instructions to perform to omit the otherwise machine language instructions to perform the editing of the data indicated or to omit implied editing of data. This omission of editing refers to the data contained in logical files identified as RECORDING MODE IS REMOTE.

10. The instructions WRITE CHECK-OUTPUT will cause the output of certain data records in the form of unedited raw data and such data records are here identified as in FIG. 7 by being prefixed with a data record identifier such as "CR" and said format-name "C1" and marking data words for separation.

Thus the instructions in accordance with the method herein cause a division of function with a key code being transmitted to the data terminal embodying instructions for editing the output of unedited raw data received from the digital computer.

11. In connection with the transmission of the format descriptor or key code (Fig. 6) to the remote data terminal, said terminal will be loaded with an object program containing instructions for the interpretation of said format descriptor by said terminal.

Thus, for example, in writing a check, a single format descriptor will be transmitted to the data terminal for the editing of a complete run of the checks to be printed, which is to say for the insertion by the remote terminal of all the symbols on the check such as spaces, commas, dollar signs and the like. Particular reference is had to the number of blank spaces present each of which requires editing. Thus significant computer time of the digital computer is saved and significant transmission time is saved by shifting of the editing function here described.

Thus it is seen that the method set forth herein with respect to the utilization and application of software to a computer system provides for significant improvement in the division of functions in a computer system reserving the use of the digital or main computer fro its essential activities such as computing and transferring functions suitable performed by a remote data terminal to such terminal. It will be understood that the transferred functions are not necessarily limited to editing functions as emphasized in the example herein;

What is claimed is:

1. An electronic digital computer method consisting of the steps of

A. adapting a compiler to accept an expanded source language;

B. including indicia in said expanded source language identifying certain logical data files as being associated with remote data terminals and said logical data files being identified as files to which certain symbols will not be added.

C. loading said computer with said compiler and using said computer to compile said expanded source language to generate machine language instructions;

D. including certain key codes in said machine language instructions indicated as being associated with remote data terminals, generating said key codes for each record of said logical data files, identifying said key codes for each record of said logical data files, identifying said key codes for each record of said respectively by including labels therewith, adapting said key codes to include a description of editing functions to be performed on each record of said logical data file;

E. loading said computer with said machine language instructions;

F. executing said machine language instructions by transmitting said key codes and said coded data records with which said key codes are associated from said computer to said remote data terminals;

G. loading an object program into said remote terminals containing instructions for interpreting said key codes, and H. interpreting said key codes and editing said data records by said remote terminal to create useable output.

* * * * *